United States Patent [19]
Decesare

[11] Patent Number: 5,839,200
[45] Date of Patent: Nov. 24, 1998

[54] MULTI-FUNCTION HORIZONTAL AND VERTICAL ALIGNMENT TOOL

[76] Inventor: Dominic Decesare, 223 Center St., Elizabeth, N.J. 07202

[21] Appl. No.: 804,316

[22] Filed: Feb. 21, 1997

[51] Int. Cl.$^6$ .................................. G01C 9/26; G01C 9/36
[52] U.S. Cl. ............................. 33/381; 33/374; 33/390
[58] Field of Search ........................... 33/374, 375, 384, 33/385, 386, 390, 534

[56] References Cited

U.S. PATENT DOCUMENTS

| | | | |
|---|---|---|---|
| 1,422,231 | 7/1922 | Stanley | 33/390 |
| 2,746,163 | 5/1956 | Moritz | 33/390 |
| 2,752,692 | 7/1956 | Smith | 33/374 |
| 2,770,889 | 11/1956 | Allegretti et al. | 33/385 |
| 3,826,013 | 7/1974 | Baher | 33/390 |
| 3,832,782 | 9/1974 | Johnson et al. | 33/390 |
| 4,964,219 | 10/1990 | Clark | 33/384 |
| 4,986,002 | 1/1991 | Oros et al. | 33/390 |
| 5,174,034 | 12/1992 | Swanda | 33/390 |
| 5,408,752 | 4/1995 | Eadens | 33/390 |
| 5,421,094 | 6/1995 | McCord et al. | 33/390 |
| 5,509,210 | 4/1996 | Murphy | 33/390 |

FOREIGN PATENT DOCUMENTS

| | | | |
|---|---|---|---|
| 145335 | 5/1954 | Sweden | 33/384 |

*Primary Examiner*—G. Bradley Bennett
*Attorney, Agent, or Firm*—Lackenbach Siegel Marzullo Aronson & Greenspan, P.C.

[57] ABSTRACT

A combination level has a carrier forming two opposite parallel major surfaces. A tube level is mounted on one of the surfaces of the circular level and a circular is mounted on the other, opposite, surface. either one of the major surfaces can be used directly to abut against a work to be aligned or an additional, preferably elongate, member can be attached to the carrier and which abuts against the work. The carrier is mounted on the abutting member at known angular relationship or the carrier can be mounted for selected angular adjustments abutting to the abutting member, so that selected positioning of the tubular and circular levels are relative to each other on substantially horizontal planes where contact of the work, allows measurement of vertical alignment and plumb condition of the work.

17 Claims, 4 Drawing Sheets

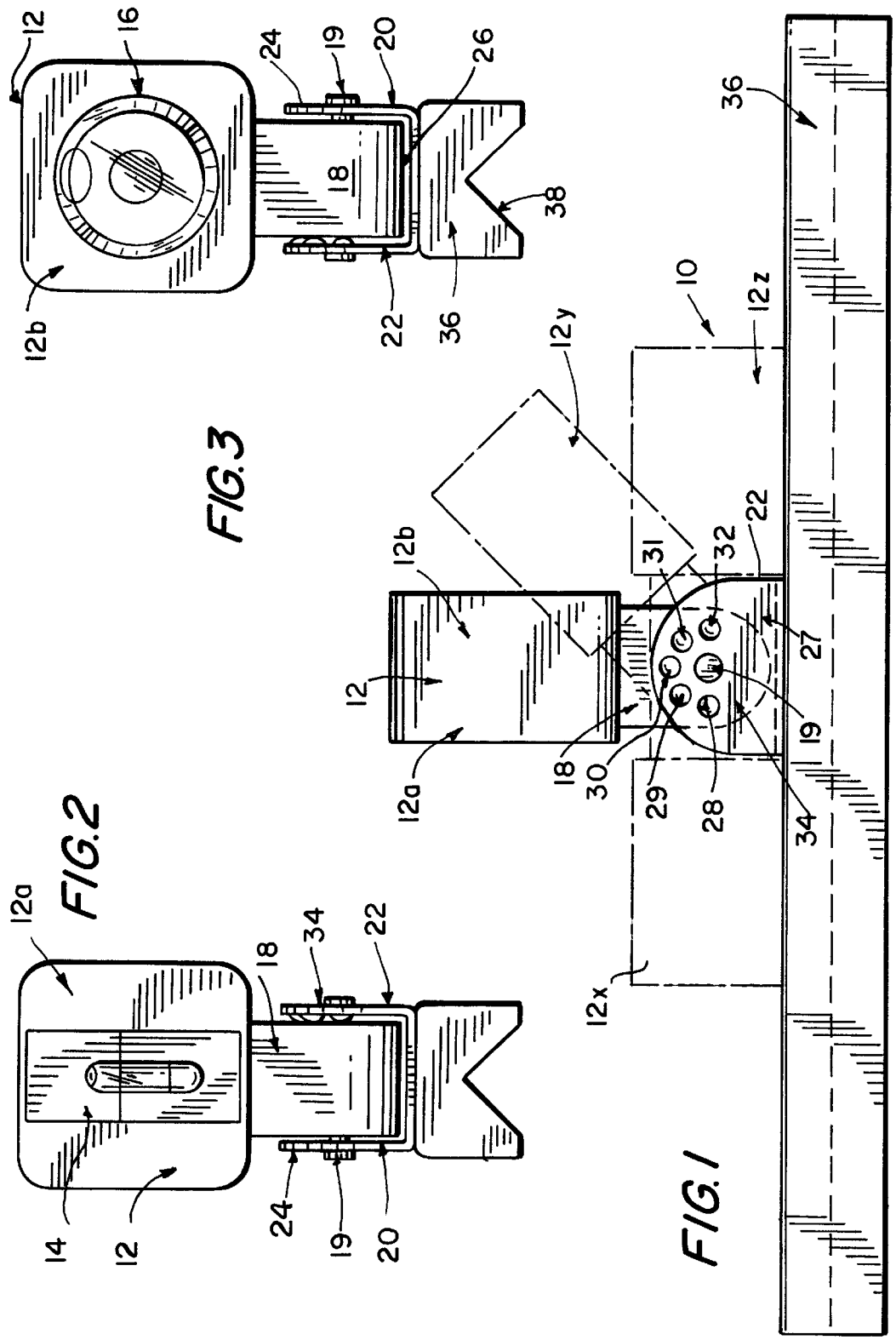

MULTI-FUNCTION HORIZONTAL AND VERTICAL ALIGNMENT TOOL

BACKGROUND OF THE INVENTION

1. Field of the Invention

The invention generally relates to measurement and alignment instruments and, more specifically, to a combination tubular and circular level.

2. Description of the Prior Art

Various prior art aligning and levelling devices used by skilled craftsmen usually embody two or more tubular spirit level inserts and generally have a longitudinally extended rectangular body provided with opposed, longitudinally extending aligning sides. With such known levels it is necessary for structural members and other related components to be levelled on two sides with the level requiring manual positioning thereon while such members or components are being nailed or otherwise suitably fixed in their properly aligned and/or levelled positions. Such operations require either two craftsmen or operation by one craftsman while he progressively taking a reading and then endeavoring to fix the member at the desired position, or further endeavoring to hold the level with one hand and both aligning and fixing the member in place with the other hand. Examples of such levelling devices are illustrated in U.S. Pat. Nos. 613,246; 2,998,655; 3,167,864; and 5,245,758. In order to facilitate the use of such tools, a number of levels have been proposed which have an L-shaped or V-shaped notch or groove configuration intended to abut against the work on more than one side or contact the work at at least two points. One such plumb level is disclosed in U.S. Pat. No. 1,845,801 in which conventional tubular spirit levels are arranged at various planes of the level. The use of conventional or tubular spirit levels are also disclosed in U.S. Pat. Nos. 657,443; 659,513; 1,749,980; and 2,667,703. A post level defined by a pair of right-angled walls and utilizing horizontal bubble vials or tubular spirit levels in each wall and a vertical bubble vial at the intersection of the walls is disclosed in U.S. Pat. No. 5,207,004. However, as with the prior mentioned designs, the use of multiple tubular level vials increases the cost of such alignment tools as well as complicates the use thereof since it requires inspection of a plurality of such tubular vials. This is also true for the corner level apparatus disclosed in U.S. Pat. No. 5,119,565.

In U.S. Pat. No. 3,832,782, a level is disclosed which is intended to be a multiple purpose leveling device which includes a body having divergently forked legs, enabling the levelling device to be held against pipes and other round objects. One feature of the level is that three 360° annular tube spirit level inserts are embodied in three 90° diverse planes. By the use of any two of the three bubbles of the spirit levels, two or more readings can be made simultaneously for one setting. The details of the annular tube spirit level inserts used are disclosed in FIG. 12 of the patent, and are described as tubular spirit levels which include an outer body surrounding a 360° annular tubular spirit level filled with a suitable liquid and forming the usual air bubble. A center disk or annular body is also preferably part of the sub-assembly and is calibrated to indicate the more commonly used 45° and 90° angular settings and the intermediate mid-point divisions thereof. It is clear that with the level disclosed in the patent at least two indications must be used to obtain an accurate plumb reading.

A universal spirit level is disclosed in U.S. Pat. No. 3,545,091 in which a longitudinally extending main body is provided with a V-shaped recess facing towards the structural member to be aligned. The open portion has interfaces that are planar and approximately 90° or in right-angular relationship. Primary and secondary handles are provided, tubular spirit level elements for horizontal and vertical alignment readings being carried in adjacent relationship to provide rough alignment readings, and a cylindrical type spirit level is positioned in a hollow portion of an adjacent inner end of the primary handle so that it can be viewed looking upwardly or downwardly substantially along the tool device and may be employed for a final, full alignment determination from the standpoint of both vertical and horizontal planes. Therefore, the tubular spirit level elements are used initially for a rough alignment and a cylindrical type of spirit level is provided for a more final, full alignment. However, the cylindrical spirit level element is fixedly mounted at the end of the primary handle, and is situated intermediate between the longitudinal or axial ends of the level device. As such, depending on how the device is held or at what angle it is held, the cylindrical spirit level may not be readily visible. Also, being fixed on the handle as disclosed limits the usefulness of the device and the versatility to determine the plumb condition for a number of different elements or members to be aligned.

SUMMARY OF THE INVENTION

It is an object of the present invention to provide a combination level which does not exhibit the disadvantages inherent in prior art levels.

It is another object of the present invention to provide a combination level which is simple in construction and economical to manufacture.

It is still another object of the present invention to provide a combination level of the type suggested in the previous objects which is simple and convenient to use.

It is yet another object of the present invention to provide a combination level which can be added to existing levels.

It is a further object of the present invention to provide a combination level which can provide an indication of the angular inclination of the work relative to the horizontal or vertical.

It is still a further object of the present invention to provide a combination level which can be used to adjust vertical and plumb conditions of various works, including rectangular structural members, circular pipes, and the like.

In order to achieve the above objects, as well as others which will become apparent hereinafter, a combination level in accordance with the present invention comprises a carrier member having two opposites substantially parallel major surfaces. A tube level is mounted substantially co-extensively with the plane defined by one of said two major surfaces. A circular level is mounted substantially co-extensively with a plane defined by the other of said two surfaces. Said carrier member includes means for abutting the level against a work to be measured or aligned while providing a known positional relationship between the work and said major surfaces. In this manner, selectively positioning said major surfaces relative to each other in substantially horizontal planes, while said abutting means contacts the work, allows measurement of the vertical alignment and plumb condition of the work. The device, the two levels on one side and the circular level on the other side, can either be used as a stand alone device or can be combined with an elongate member or another conventional level to obtain the advantages of the present invention.

BRIEF DESCRIPTION OF THE DRAWINGS

The aforementioned objects and other features of the present invention will become more apparent from the following description in conjunction with the accompanying drawings, wherein:

FIG. 1 is a side-elevational view of a combination level in accordance with the present invention, mounted for pivotal or angular adjustment relative to an elongate member which abuts against the work, and being shown in an orientation normal to the elongate member while showing the combination level in other possible positions in phantom outline;

FIG. 2 is a combination level shown in FIG. 1, as viewed from the left side;

FIG. 3 is a combination level shown in FIG. 1, as viewed from the right side;

DESCRIPTION OF THE PREFERRED EMBODIMENTS

Figure 4:
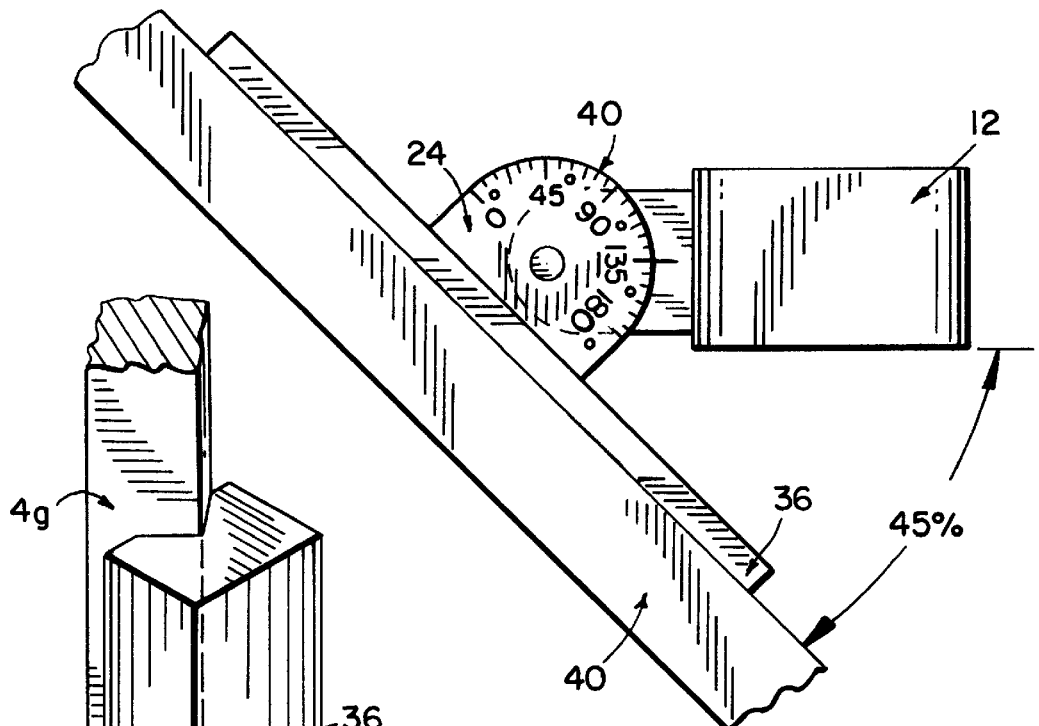
FIG. 4 is a fragmented view of an alternate embodiment of the combination level shown in FIG. 1, in which the bracket for adjustably mounting the combination level is provided with a scale to indicate the relative angular position of the combination level in relation to the elongate member and the work.

Referring now specifically to the figures, in which the identical or similar parts will be designated by the same reference numeral throughout, and first referring to FIG. 1, a combination level in accordance with the present invention is generally designated by the reference numeral 10.

The combination level 10 includes a carrier member 12, which defines two spaced substantially parallel opposing surfaces 12a and 12b. As best shown in FIGS. 2 and 3, a tubular or linear level 14 is mounted substantially co-extensively with the plane defining the major surface 12a, while a circular level 16 is mounted substantially co-extensively with the plane defined by the opposing major surface 12b . In the illustrated embodiment, the carrier member 12 is generally in the form of a rectangular body, although, clearly, the specific shape of the carrier member 12 is not critical for purposes of the invention.

In the embodiment, illustrated in FIGS. 1–4, the carrier or rectangular body 12 is supported, between the major surfaces 12a, 12b, by means of an extension 18 which is mounted for pivoting movements about pivot pin 19. The pivot pin 19 is supported on a U-shaped bracket 20 (FIGS. 2,3) which has flanges 22, 24 and an intermediate connecting or supporting portion 26. To provide some control on the pivoted position of the carrier 12 on the U-shaped bracket 20 there is preferably provided some form of a detent mechanism 27 for selectively and temporarily maintaining a desired or selected position of the carrier member 12 about the pivot pin 19. In the illustrated embodiment, such detent mechanism or device 27 is in the form of a plurality of holes 28–32, spaced from each other at equal distances from the pivot pin 19 about an arc in the flange 22, as best shown in FIG. 1. At least one spring-loaded bearing 34 is provided intermediate the flange 22 and the extension 18 so that the bearing 34 is urged outwardly to be at least partially received within one of the holes 28–32. The carrier 12 may be rotated or pivoted about the pin 19 by application of sufficient force to overcome spring bias applied to the bearing 34. Once the bearing is received within one of the holes 28–32, however, the spring bias will serve to maintain the carrier 12 in the selected position. In the embodiment shown, the holes 28–32 are angularly spaced at 45° discreet increment. Thus, when the bearing 34 is within the hole 28, the carrier is shown in phantom at position 12x. When the bearing is within the center hole 30, the carrier is moved 90° from position 12x to the solid outline position shown in FIG. 1. In the phantom outline of the carrier 12y, with the bearing and hole 31, the carrier is displaced 135° from position 12x. When the bearing is in hole 32, the position 12z of the carrier shown in phantom outline is angularly displaced 180° from position 12x. The connecting or supporting portion 26 of the U-shaped bracket 20 is preferably attached to an engagement member 36 which, as best shown in FIGS. 2 and 3, is provided with a longitudinal V-shaped notch 38. The angle α (FIG. 2) defined by the notch surfaces is not critical although, in the preferred embodiment, the notch 38 defines an angle α=90°. It will be clear from FIG. 1, therefore, that the movements of the carrier 12 about the pivot pin 19 provides pre-selected displacements of the carrier 12 relative to the elongate member 36 which is intended to engage a work, such as an elongate structural member, a pipe or the like as to be described. It will also be clear from FIG. 1 that the circular level 16 will be exposed and horizontal at position 12x of the carrier member 12, while the tubular level 14 on the surface 12a will be visible and substantially parallel to the elongate member 36 in position 12z of the carrier.

In FIG. 4, the flange 24 of the U-shaped bracket 20 is shown provided with an angular scale covering the ranges 0°–180°, which corresponds to the angular displacements selectable with the detent mechanism or device 27.

In FIG. 4, one of the applications of the level 4 is illustrated. Here, the carrier 12 is positioned at the 135° mark on the printed scale 40 to form a 45° angle with the elongate member 36. By arranging the carrier 12 to be oriented on a horizontal plane, as shown, the major surface 12a will appear as a top surface of the carrier 12, exposing the tubular scale 14. By placing the elongate member 36 against a work 42, such as a structural member, and adjusting the elongate member 36 until the elongate tubular level 14 air bubble is centered, this will assure that the work or structural member 42 is positioned at an angle of 45° to the horizontal or vertical positions. The same result could have been achieved by placing the carrier 12 at the 45° mark and reversing the elongate member 36 by 180° so that, again, it aligns with the work 42. In that case, the major surface 12b would be the upper surface of the carrier 12 as shown in FIG. 4 and the circular level 16 could be used for the adjustment.

Figure 5:
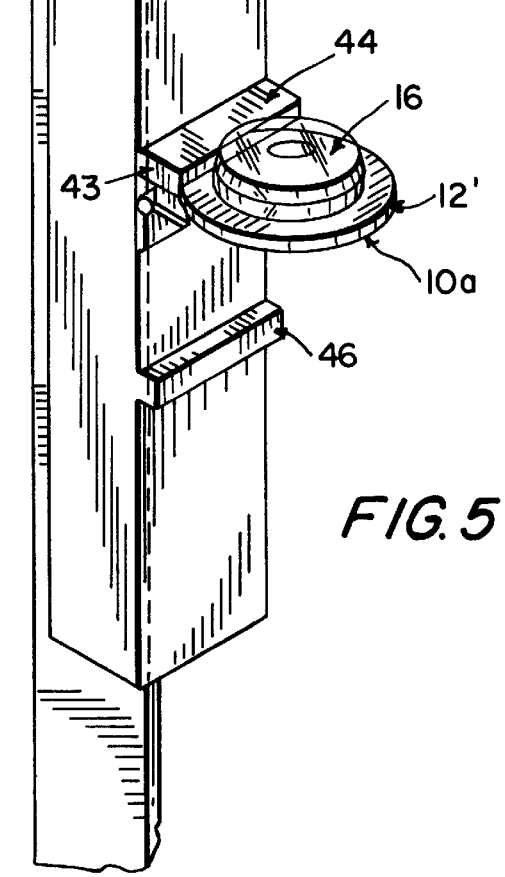
FIG. 5 is a perspective view of a further embodiment of the combination level of the invention, indicated during use establishing the plumb condition of a work in the form of an elongate structural member.

Referring to FIG. 5, another embodiment 10a of the present invention is illustrated in the form of a circular disk 12'. The tubular and circular levels 14–16 are mounted on opposite sides of the disk 12' and the disk is mounted for pivotal movement about pivot 43. If necessary, due to the thicknesses or dimensions of the circular or disk carrier 12' and the dimensions of the tubular and circular levels 14, 16, there may be provided stops 44 and 46 as shown in FIG. 5 which limit the extreme pivoted positions of the disk 12' to the 90° position, when abutting the stop 44 and the 0° position when abutting against the stop 46.

In FIG. 5, the level 10a is used in one of its applications, namely to measure the plumb orientation of the structural member 42 with the use of the circular level 16. Thus, when the circular level 16 abuts the stop 44 to render the same in a 90° plane to the elongate member 36, the circular level 16 will show perfect alignment in a vertical direction only when the elongate member 36 is itself positioned in a vertical position. By placing the notch 38 into contact with two adjacent surfaces of the structural member 42, adjustments can be made to guarantee the plumb position at the number 42 when the elongate member 36 is itself in the plumb position.

Figure 6:
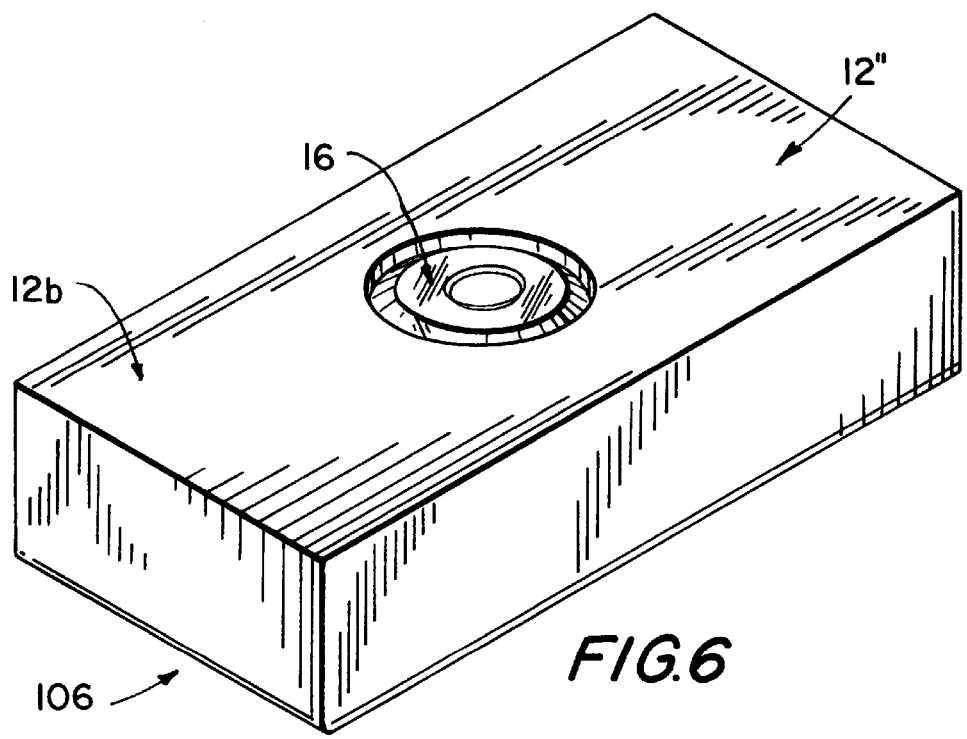
FIG. 6 is a perspective view of a still further embodiment of the present invention, showing the side on which the circular level is mounted.
Figure 7:
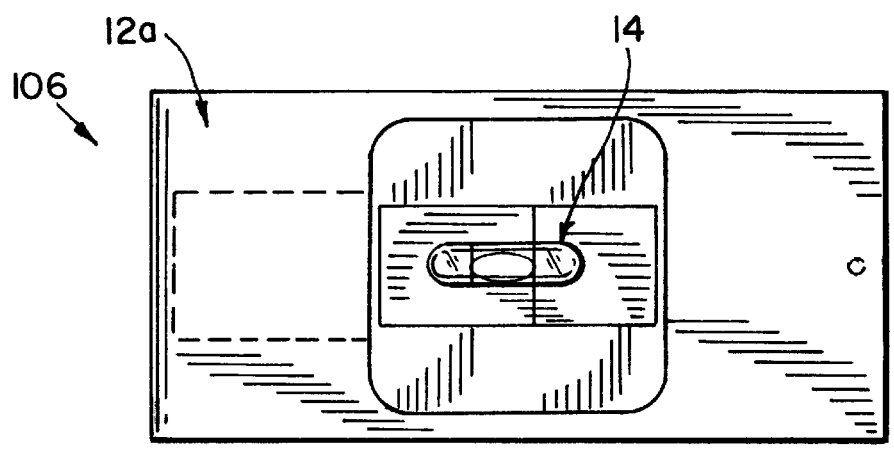
FIG. 7 is a top plan view of the combination level as shown in FIG. 6, but showing the opposite side on which the linear or tube level is mounted.

Referring to FIGS. 6 and 7, a simplified form of a level 10b is illustrated. Here, the carrier 12" is in the form of a rectangular block. As before, the circular level 16 is mounted substantially co-extensively in the plane of one of the major surfaces 12b, while the tubular level 14 is similarly arranged in the plane of the opposing major surface 12a. While the level 10b does not have the flexibility or versatility of arranging structural members at intermediate angles, the level 10b can be used in the same manner to arrange a structural member in a horizontal position, vertical position or plumb orientation. This can be done by adjusting the positions of the vertical planes or surfaces 12a, 12b to alternately expose the tubular and circular levels. It will be noted, therefore, that the level 10b, in its simplest form, still provides useful features and advantages not available with prior art levels.

Figure 8:
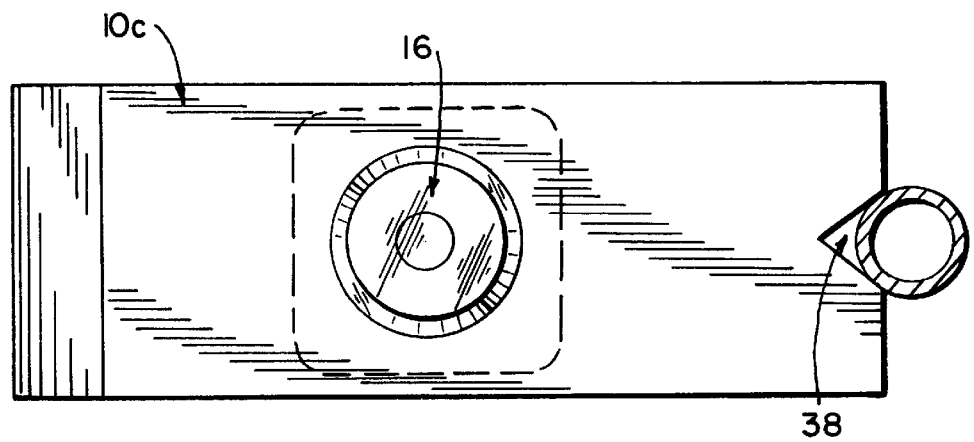
FIG. 8 is a top plan view of a still further embodiment of the invention, shown abutting a tubular member for establishing its plumb position.
Figure 9:
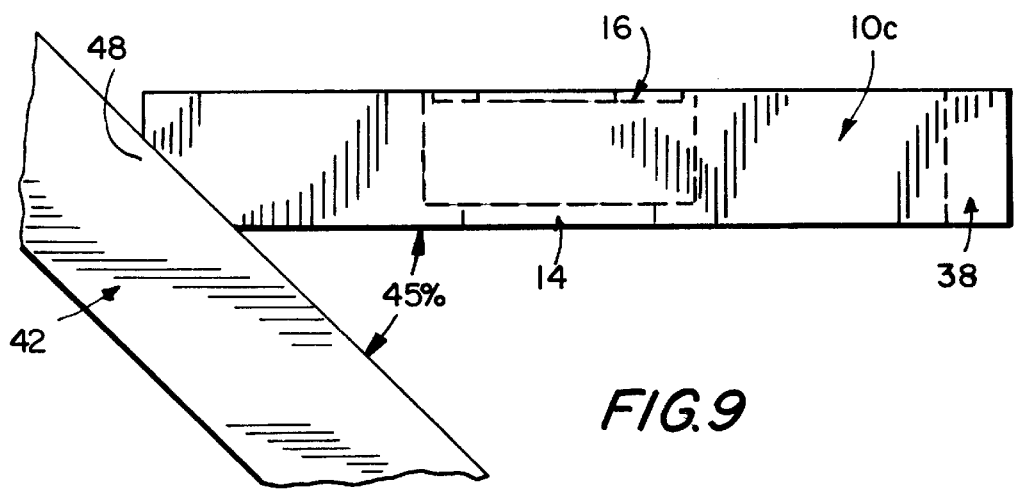
FIG. 9 is a side elevational view of the combination level shown in FIG. 8, as used for establishing 45° inclination of a work in the form of a structural member.

Referring to FIGS. 8 and 9, a still further embodiment 10c of the level in accordance with the present invention is illustrated. Here, the carrier 12" is provided with a V-shaped notch 38 on one end thereof, while provided with a 45° inclined surface 48 at the opposite end thereof. In FIG. 8, the notch 38 is shown used to abut against a tubular member, such as a pipe, while exposing the tubular level 16. In FIG. 9, the inclined surface 48 is shown abutting against a work 42. By exposing the circular level 16 in FIG. 9, the work 42 can be adjusted to be at a 45° angle relative to the vertical or horizontal position when the circular level becomes centered. Therefore, the level 10c provides many of the advantages or features obtainable with the first described level 10, but without the pivoting arrangement. Of course, the embodiment 10 of FIGS. 1–4 may provide additional angular adjustments besides 45° and 90°.

While this invention has been described in detail with particular reference to a preferred embodiment thereof, it will be understood that variations and modification will be effected within the spirit and scope of the invention as described herein and as defined in the appended claims.

I claim:

1. Combination level comprising a carrier member having two opposite substantially parallel major surfaces; a tube level mounted substantially co-extensively with a plane defined by one of said two surfaces; a circular level mounted substantially co-extensively with a plane defined by the other of said two surfaces, said carrier member including means for abutting said carrier member against a work to be measured or aligned while providing at least one known angular positional relationship greater than 0° and less than 90° between the work and said major surfaces, whereby selectively positioning said major surfaces in substantially horizontal planes, while said means for abutting contacts the work, establishes the angular orientation of the work including vertical alignment and plumb condition of the work as well as said at least one angular positional relationship greater than 0° and less than 90°.

2. Combination level as defined in claim 1, wherein said carrier comprises a substantially rectangular body.

3. Combination level as defined in claim 2, wherein said means for abutting comprises one of said major surfaces.

4. Combination level as defined in claim 2, wherein said means for abutting comprises a surface on said rectangular body which is inclined 45° relative to said major surfaces.

5. Combination level as defined in claim 1, wherein said means for abutting comprises an elongate member supporting said carrier and having an elongate notch extending along the longitudinal length of said elongate member for receiving a portion of the work to be measured or aligned.

6. Combination level as defined in claim 5, wherein said notch and said carrier are on opposite sides of said means for abutting.

7. Combination level as defined in claim 5, wherein said notch includes an angle of approximately 90°.

8. Combination level as defined in claim 5, wherein the length of said elongate member is substantially longer than the dimensions of said carrier.

9. Combination level as defined in claim 5, wherein said carrier is mounted on said elongate member for selective movement of said carrier relative to said elongate member.

10. Combination level as defined in claim 9, wherein mounting means is provided for movably mounting said carrier within a plane substantially parallel to the length direction of said elongate members.

11. Combination level as defined in claim 10, wherein said mounting means comprises a U-shaped bracket having two spaced parallel upright flanges and a connecting portion extending between said upright flanges connected to said elongate member, said carrier including an extended portion received between said upright flanges; and pivot means for pivotally mounting said extended portion on said upright flanges, whereby said carrier can be moved relative to said elongate member approximately 180° about said pivot means.

12. Combination level as defined in claim 11, further comprising detent means for selectively retaining said carrier in one of a number of different angular positions about said pivot means.

13. Combination level as defined in claim 11, wherein said detent means includes five detented positions about said pivot means.

14. Combination level as defined in claim 13, wherein two of said detented positions are 0°, 45° and 90° relative to said elongate member.

15. Combination level as defined in claim 12, wherein said detent means comprises a plurality of holes in one of said flanges, and spring actuated bearings arranged to be selectively and at least partially received in one of said hole.

16. Combination level as defined in claim 11, wherein indicia means is provided on at least one of said flanges which is provided with printed indicia for providing an accurate reading of the relative position of the work.

17. Combination level as defined in claim 5, wherein said carrier member is pivotally mounted on said elongate member, and further comprising stop means for limiting pivoting movements of said carrier member between a first position parallel to said elongate member and a second position normal to the length direction of said elongate member.

\* \* \* \* \*